(12) United States Patent
Wu et al.

(10) Patent No.: US 12,149,190 B2
(45) Date of Patent: Nov. 19, 2024

(54) POWER TOOL, IMPACT WRENCH, AND TOOL CONTROL METHOD

(71) Applicant: Nanjing Chervon Industry Co., Ltd., Nanjing (CN)

(72) Inventors: Yongkang Wu, Nanjing (CN); Longxiang Liu, Nanjing (CN); Junya Duan, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 128 days.

(21) Appl. No.: 17/955,847

(22) Filed: Sep. 29, 2022

(65) Prior Publication Data

US 2023/0163706 A1 May 25, 2023

(30) Foreign Application Priority Data

Nov. 23, 2021 (CN) .......................... 202111392151.2

(51) Int. Cl.
*H02P 21/18* (2016.01)
*H02P 23/14* (2006.01)

(52) U.S. Cl.
CPC .............. *H02P 21/18* (2016.02); *H02P 23/14* (2013.01)

(58) Field of Classification Search
CPC .. H02P 21/18; H02P 23/14; H02P 6/15; H02P 6/08; H02P 6/14; H02P 6/17; H02K 29/08
USPC ....................................... 318/432, 3
See application file for complete search history.

(56) References Cited

U.S. PATENT DOCUMENTS

| | | | | |
|---|---|---|---|---|
| 7,590,334 B2 * | 9/2009 | Yabusaki | ................ | H02P 25/18 318/400.06 |
| 8,111,030 B2 * | 2/2012 | Chiu | ...................... | H02P 23/02 318/599 |
| 9,893,658 B2 * | 2/2018 | Winker | .................... | H02P 6/182 |
| 10,759,012 B2 * | 9/2020 | Naito | ................. | B23Q 11/0039 |

* cited by examiner

*Primary Examiner* — David Luo
(74) *Attorney, Agent, or Firm* — Greenberg Traurig, LLP

(57) ABSTRACT

A power tool includes a motor, an output shaft, a commutation detection device, and a controller. The commutation detection device is connected to the motor and used for obtaining commutation information of the motor. The controller is capable of outputting a control signal to control the motor to rotate. When the commutation information does not match a preset commutation condition, the control signal is adjusted based on the commutation information such that a rotational speed of the motor is maintained to be a target rotational speed.

17 Claims, 3 Drawing Sheets

POWER TOOL, IMPACT WRENCH, AND TOOL CONTROL METHOD

RELATED APPLICATION INFORMATION

This application claims the benefit under 35 U.S.C. § 119(a) of Chinese Patent Application No. CN 202111392151.2, filed on Nov. 23, 2021, which application is incorporated herein by reference in its entirety.

BACKGROUND

With the development of power tools, the intelligent control technology of power tools is more and more widely applied. For example, a controller is used for adjusting a power supply voltage of an electric motor so that a power tool has characteristics such as quick starting and smooth braking.

However, if an existing power tool working at a low speed performs an impact action, cases such as a locked rotor will occur due to the low speed and low torque. Thus, it is difficult for the power tool to complete a working task in a special working condition. For example, the so-called special working condition refers to that when an object to be impacted is relatively soft wood or another relatively soft material or when an impact drill bit is relatively small, the tool needs to perform the impact action at a relatively low rotational speed.

SUMMARY

An example of the present application provides a power tool. The power tool includes an electric motor, an output shaft, a commutation detection device, and a controller. The output shaft is electrically connected to the electric motor. The commutation detection device is electrically connected to the electric motor and used for detecting and obtaining commutation information about each commutation of the electric motor. The controller is electrically connected to at least the electric motor and the commutation detection device and capable of outputting a control signal to control the electric motor to rotate. The controller is configured to receive the commutation information of the electric motor and when the commutation information does not match a preset commutation condition, adjust the control signal based on the commutation information such that a rotational speed of the electric motor is maintained to be a target rotational speed.

In an example, the controller is configured to, when a current commutation of the electric motor is not completed, update commutation information about the current commutation according to commutation information about a last commutation and adjust the control signal according to the updated commutation information about the current commutation such that the rotational speed of the electric motor is maintained to be the target rotational speed.

In an example, the controller is configured to calculate the rotational speed of the electric motor according to the updated commutation information about the current commutation and adjust and output the control signal when the rotational speed of the electric motor does not satisfy the target rotational speed such that the rotational speed of the electric motor is maintained to be the target rotational speed.

In an example, the commutation information about each commutation of the electric motor includes at least a commutation start point of the each commutation, a commutation end point of the each commutation, and duration required for the each commutation.

In an example, the controller is configured to update commutation duration of the current commutation using a commutation end point of the last commutation as a commutation start point of the current commutation and calculate the rotational speed of the electric motor according to the updated commutation duration of the current commutation.

In an example, that the current commutation of the electric motor is not completed includes that commutation duration of the current commutation of the electric motor is longer than commutation duration of the last commutation or that no commutation is performed within commutation duration of the current commutation.

In an example, the target rotational speed is greater than or equal to 100 RPM and less than or equal to 300 RPM.

In an example, the target rotational speed is greater than or equal to 100 RPM and less than or equal to 200 RPM.

In an example, the target rotational speed is greater than or equal to 100 RPM and less than or equal to 150 RPM.

In an example, the electric motor is a sensorless motor.

In an example, the controller is configured to, when the commutation duration of the electric motor is longer than or equal to a set threshold, control the electric motor to perform locked rotor protection in a process in which the electric motor rotates at the target rotational speed.

An example of the present application further provides an impact wrench. The impact wrench includes an electric motor, an output shaft, a commutation detection device, and a controller. The output shaft is connected to the electric motor. The commutation detection device is electrically connected to the electric motor and used for detecting and obtaining commutation information about each commutation of the electric motor. The controller is electrically connected to at least the electric motor and the commutation detection device and capable of outputting a control signal to control the electric motor to rotate. The controller is configured to: receive commutation information of the electric motor; and when the commutation information does not match a preset commutation condition, adjust the control signal based on the commutation information such that a rotational speed of the electric motor is maintained to be a target rotational speed.

In an example, the target rotational speed is greater than or equal to 100 RPM and less than or equal to 300 RPM.

In an example, the target rotational speed is greater than or equal to 100 RPM and less than or equal to 200 RPM.

In an example, the target rotational speed is greater than or equal to 100 RPM and less than or equal to 150 RPM.

An example of the present application further provides a control method for a power tool. The control method is performed by the power tool. The power tool includes an electric motor, an output shaft, a commutation detection device, and a controller. The output shaft is connected to the electric motor. The commutation detection device is electrically connected to the electric motor and used for detecting and obtaining commutation information about each commutation of the electric motor. The controller is electrically connected to at least the electric motor and the commutation detection device and capable of outputting a control signal to control the electric motor to rotate. The control method includes: receiving the commutation information of the electric motor; and when the commutation information does not match a preset commutation condition, adjusting the control signal based on the commutation information such that a rotational speed of the electric motor is maintained to be a target rotational speed.

In an example, the control method further includes: when a current commutation of the electric motor is not completed, updating commutation information about the current commutation according to commutation information about a last commutation and adjusting the control signal according to the updated commutation information about the current commutation such that the rotational speed of the electric motor is maintained to be the target rotational speed.

In an example, the commutation information about each commutation of the electric motor includes at least a commutation start point of the each commutation, a commutation end point of the each commutation, and duration required for the each commutation.

In an example, the control method further includes: updating commutation duration of a current commutation using a commutation end point of a last commutation as a commutation start point of the current commutation and calculating the rotational speed of the electric motor according to the updated commutation duration of the current commutation.

DETAILED DESCRIPTION

Figure 1:
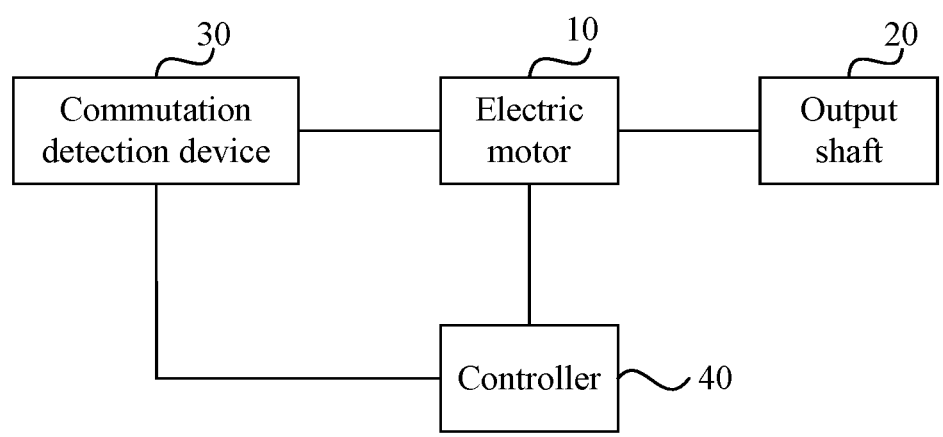
FIG. 1 is a block diagram of a circuit structure of a power tool in an example of the present application.

The present application is further described in detail hereinafter in conjunction with the drawings and examples. It is to be understood that the examples described herein are merely intended to illustrate the present application and not to limit the present application. Additionally, it is to be noted that for ease of description, only part, not all, of structures related to the present application are illustrated in the drawings.

Figure 2:
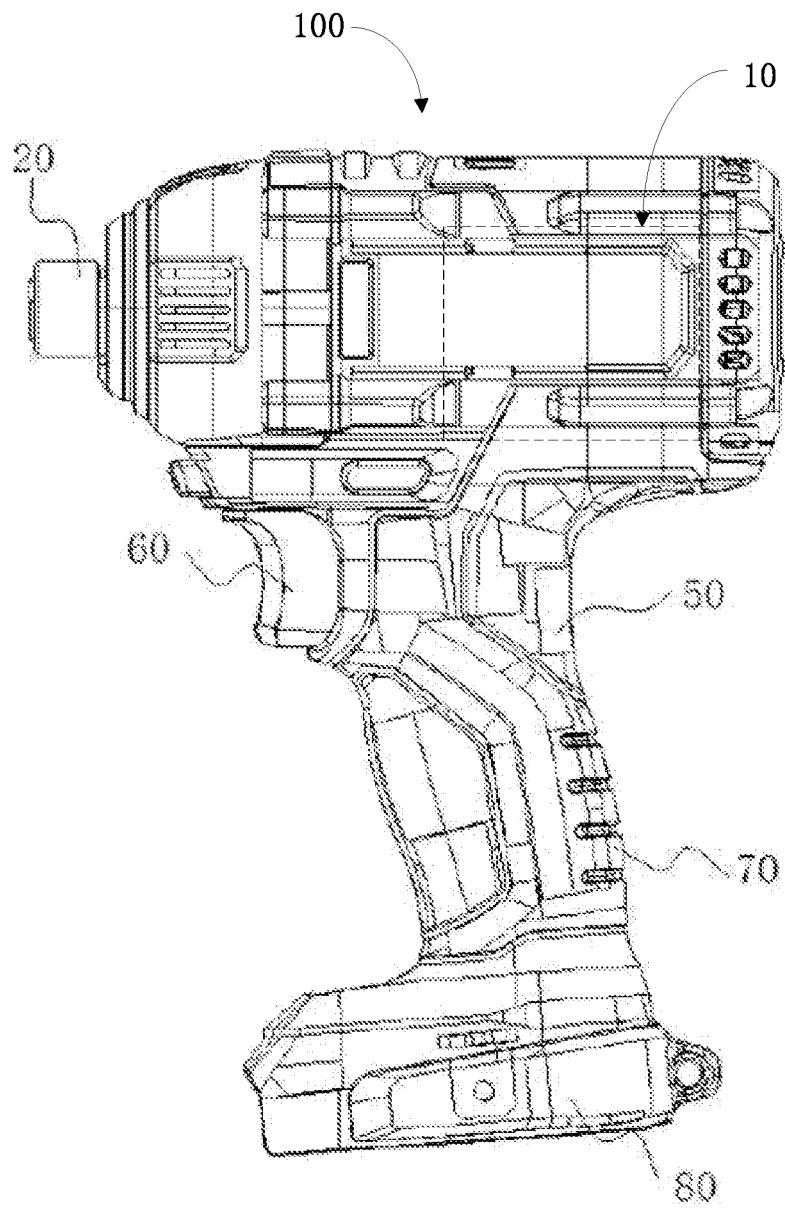
FIG. 2 is a structural view of an impact tool in an example of the present application.

As shown in FIGS. 1 and 2, FIG. 1 is a block diagram of a circuit structure of a power tool 100 according to an example of the present application, and FIG. 2 is a structural view of an impact tool according to an example of the present application. It is to be noted that in addition to the power tool 100 shown in FIG. 2, any other impact power tool 100 that uses a sensorless brushless motor or a sensored brushless motor and can perform low-speed control may use a control method described in the present application.

Referring to FIG. 1, the power tool 100 includes an electric motor 10, an output shaft 20, a commutation detection device 30, and a controller 40. The output shaft 20 is electrically connected to the electric motor 10. The commutation detection device 30 is electrically connected to the electric motor 10 and used for detecting and obtaining commutation information about each commutation of the electric motor 10. The controller 40 is electrically connected to at least the electric motor 10 and the commutation detection device 30. The controller 40 is configured to receive the commutation information of the electric motor 10 and when the commutation information does not match a preset commutation condition, adjust a control signal based on the commutation information such that a rotational speed of the electric motor 10 is maintained to be a target rotational speed.

The electric motor 10 may be a sensorless brushless direct current motor and performs multiple commutations within one electrical period. The output shaft 20 is connected to the electric motor 10 and can be driven by the electric motor 10 to rotate so that a drill bit or another tool accessory mounted on the output shaft 20 is driven to rotate. The commutation detection device 30 is electrically connected to the electric motor 10 and the controller 40 separately and used for detecting and obtaining the commutation information about each commutation of the electric motor 10 and sending the commutation information to the controller 40. The controller 40 is used for receiving the commutation information about each commutation of the electric motor 10 and when the commutation information does not match the preset commutation condition, adjusting the control signal based on the commutation information such that the rotational speed of the electric motor 10 is maintained to be the target rotational speed. It is to be understood that with control information output by the controller 40, switching elements in a driver circuit (not shown) in the tool can be controlled to change driving states such that the electric motor 10 is driven to change a rotation state. The commutation detection device 30 may estimate a position of a rotor of the electric motor 10 during the rotation of the electric motor 10 to determine the commutation information of the electric motor 10.

It is to be noted that the preset commutation condition may be: whether the electric motor 10 completes a commutation action when performing each commutation; whether the electric motor 10 completes the commutation when a duration of a current commutation of the electric motor 10 reaches a duration of a last commutation; or the like. The preset commutation condition may be specifically set according to actual situations and is not specifically limited herein.

In the technical solution in this example, the power tool 100 may be an impact tool, for example, an impact wrench. For example, in conjunction with FIGS. 1 and 2, the power tool 100 is the impact wrench. The impact wrench is typically used for performing an impact operation at a relatively low speed such as impact on a very soft board and alignment of a drill bit with a relatively small size. However, since it is very difficult for the impact wrench to work at a relatively low speed and maintain the output of a constant and low speed, operations such as the impact on the board and the alignment of the drill bit are difficult to perform smoothly. Therefore, the power tool 100 provided by the present application can implement the following: when a user needs to operate the power tool 100 to perform the operations at a constant and low speed, such as the impact on the board and the alignment of the drill bit, the commutation detection device 30 detects and obtains the commutation information about each commutation of the electric motor 10 in real time and sends the commutation information to the controller 40, the controller 40 receives the commutation information of the electric motor 10 and compares the commutation information with the preset commutation condition, and when the commutation information does not match the preset commutation condition, the controller 40 adjusts the control signal based on the commutation information such that the rotational speed of the electric motor 10 is maintained to be the target rotational speed and thus, the output shaft 20 can also output the target rotational speed continuously and stably so that the user can perform the impact on the board continuously, align the drill bit, and the like.

For example, FIG. 2 shows the structural view of the impact tool. Referring to FIG. 2, the impact wrench includes a housing 50, a trigger 60, a grip 70, a battery pack 80, the electric motor 10, the output shaft 20, the commutation detection device 30, and the controller. The housing 50 is formed with the grip 70 for the user to grip. Of course, the grip 70 may be a separate part. The housing 50 constitutes a main body of the impact tool and is used for accommodating the electric motor 10, the controller, a transmission assembly, and other electronic components such as a circuit board. The output shaft 20 may be used for mounting a functional part such as the drill bit.

Optionally, the target rotational speed may be greater than or equal to 100 RPM and less than or equal to 300 RPM, for example, 100 RPM, 150 RPM, 200 RPM, 250 RPM, 300 RPM, or the like.

According to the technical solution in this example, the power tool 100 is provided, which includes the electric motor 10, the output shaft, the commutation detection device 30, and the controller, where the output shaft is electrically connected to the electric motor 10, the commutation detection device 30 is electrically connected to the electric motor 10 and used for detecting and obtaining the commutation information about each commutation of the electric motor 10, and the controller 40 is electrically connected to at least the electric motor 10 and the commutation detection device 30 and configured to receive the commutation information of the electric motor 10 and when the commutation information does not match the preset commutation condition, adjust the control signal based on the commutation information such that the rotational speed of the electric motor 10 is maintained to be the target rotational speed. It can be seen that the power tool 100 can solve the problem that it is difficult for an existing power tool 100 working at a low speed to complete a target working task due to the low speed and low torque. In a working process, the power tool 100 receives the commutation information of the electric motor 10 and can adjust the control signal based on the commutation information when the commutation information does not match the preset commutation condition such that the rotational speed of the electric motor 10 is maintained to be the target rotational speed. Thus, the case can be avoided where the power tool 100 cannot complete the working task in the process since the electric motor 10 outputs a relatively low speed or has an unstable rotational speed, and the power tool 100 can be controlled to work at a constant and low speed.

Optionally, when the commutation information does not match the preset commutation condition, the control signal is adjusted based on the commutation information such that the rotational speed of the electric motor 10 is maintained to be the target rotational speed in a manner that includes the operation described below.

When the current commutation of the electric motor 10 is not completed, commutation information about the current commutation is updated according to the commutation information about the last commutation, and the control signal is adjusted according to the updated commutation information about the current commutation such that the rotational speed of the electric motor 10 is maintained to be the target rotational speed.

The preset commutation condition may be whether the electric motor 10 completes the commutation when performing each commutation. Specifically, the current state of the electric motor 10 is defined as the current commutation state. The electric motor 10 is in a state of performing the current commutation, if the commutation detection device 30 detects that the current commutation of the electric motor 10 is not completed, the controller 40 updates the commutation information about the current commutation according to the commutation information about the last commutation of the electric motor 10 and adjusts the output of the control signal using the updated information about the current commutation as the commutation information about the current commutation state such that the electric motor 10 can maintain its running at the target rotational speed.

Optionally, the control signal is adjusted according to the updated commutation information about the current commutation such that the rotational speed of the electric motor 10 is maintained to be the target rotational speed in a manner that includes the operation described below.

The rotational speed of the electric motor 10 is calculated according to the updated commutation information about the current commutation, and when the rotational speed of the electric motor 10 does not satisfy the target rotational speed, the control signal is adjusted and output such that the rotational speed of the electric motor 10 is maintained to be the target rotational speed.

The rotational speed of the electric motor 10 is related to the commutation information of the electric motor 10. Therefore, in order that the electric motor 10 can output a stable target rotational speed, the controller 40 calculates the rotational speed of the electric motor 10 according to the updated information about the current commutation and compares the calculated rotational speed with the target rotational speed, and when the calculated rotational speed does not satisfy the target rotational speed, the controller 40 adjusts and outputs the control signal. For example, the control signal is output in the form of increasing a duty cycle such that the rotational speed of the electric motor 10 is maintained to be the target rotational speed. Thus, the output shaft can output the target rotational speed constantly so that the user can implement the operations such as the impact on a very soft board and the alignment of the drill bit with a relatively small size.

The control signal may be a control signal with a certain duty cycle and is used for driving the electric motor 10 to run constantly at the target rotational speed. The manner of adjusting the control signal may be to output an adjusted signal by increasing the duty cycle or decreasing the duty cycle. For example, the target rotational speed is 100 RPM. Assuming that the rotational speed of the electric motor 10 calculated according to the updated commutation information about the current commutation is less than 100 RPM, the controller 40 outputs the adjusted signal by increasing a pulse-width modulation (PWM) duty cycle such that the rotational speed of the electric motor 10 is maintained to be 100 RPM. It is to be noted that the adjustment has certain hysteresis, which does not affect the capability of the power tool 100 to bear a load at a low speed. For example, when the rotational speed of the electric motor 10 drops to 80 RPM, the power tool 100 can still perform impact in the process in which the PWM duty cycle is adjusted according to the updated commutation information about the current commutation to increase the rotational speed to 100 RPM.

Optionally, the commutation information about each commutation of the electric motor 10 includes at least a commutation start point of each commutation, a commutation end point of each commutation, and duration required for each commutation.

When running, the electric motor 10 performs multiple commutations according to a certain period, for example, the electric motor 10 performs six commutations within one period. Normally, within the same period, the electric motor 10 has the same commutation duration for each commutation. However, due to a locked rotor of the electric motor 10 or the like, commutation duration of the current commutation of the electric motor 10 is longer than commutation duration of the last commutation, or no commutation is performed within the duration of the current commutation. Therefore, within the same period, the commutation duration of each commutation of the electric motor 10 is different. Since the commutation duration of the electric motor 10 is related to the rotational speed of the electric motor 10, the commutation duration, the commutation start point, and the commutation end point of each commutation of the electric motor 10 need to be detected.

Optionally, the rotational speed of the electric motor 10 is calculated according to the updated commutation information about the current commutation in a manner that includes the operation described below.

The commutation duration of the current commutation is updated using a commutation end point of the last commutation as a commutation start point of the current commutation, and the rotational speed of the electric motor 10 is calculated according to the updated commutation duration of the current commutation.

Specifically, when the commutation information about the current commutation of the electric motor 10 does not satisfy the preset commutation condition, the update is performed using the commutation end point of the last commutation as the commutation start point of the current commutation. The commutation duration of the current commutation is calculated and updated according to an updated commutation start point of the current commutation and a commutation end point at which the current commutation is actually completed. The rotational speed of the electric motor 10 is recalculated by the updated duration of the current commutation, and the calculated rotational speed is compared with the target rotational speed. When the calculated rotational speed does not satisfy the target rotational speed, the control signal is adjusted and output. For example, the control signal is output in the form of increasing the duty cycle such that the rotational speed of the electric motor 10 is maintained to be the target rotational speed. Thus, the output shaft can output the target rotational speed constantly so that the user can implement the operations such as the impact on a very soft board and the alignment of the drill bit with a relatively small size.

Optionally, that the current commutation of the electric motor 10 is not completed includes that the commutation duration of the current commutation of the electric motor 10 is longer than the commutation duration of the last commutation or that no commutation is performed within the duration of the current commutation.

The rotational speed of the electric motor 10 is related to the commutation duration of each commutation. For example, the target rotational speed is 100 RPM. When the rotor of the electric motor 10 is not locked, the rotational speed of the electric motor 10 is calculated according to the commutation duration. However, when the rotor of the electric motor 10 is locked, the duration required for the commutation becomes longer because of the locked rotor. If the rotational speed is still calculated according to an original commutation duration, the calculated rotational speed will be greater than an actual rotational speed. Moreover, the rotational speed of the electric motor 10 has been less than the target rotational speed of 100 RPM. Since the calculated rotational speed is still 100 RPM, the controller 40 will not increase the PWM duty cycle automatically and so the actual rotational speed of the electric motor 10 will not reach the target rotational speed. In addition, if the rotational speed continues to drop, the power tool 100 cannot continue the impact at a low speed (for example, 100 RPM) and thus cannot bear a load at the low speed. Therefore, when the commutation duration of the current commutation of the electric motor 10 is longer than the commutation duration of the last commutation or no commutation is performed within the duration of the current commutation, the update is performed using the commutation end point of the last commutation as the commutation start point of the current commutation. The commutation duration of the current commutation is calculated and updated according to the updated commutation start point of the current commutation and the commutation end point at which the current commutation is actually completed. The rotational speed of the electric motor 10 is recalculated by the updated duration of the current commutation, and the calculated rotational speed is compared with the target rotational speed. When the calculated rotational speed does not satisfy the target rotational speed, the control signal is adjusted and output. For example, the control signal is output in the form of increasing the duty cycle such that the rotational speed of the electric motor 10 is maintained to be the target rotational speed. Thus, the output shaft can output the target rotational speed constantly so that the user can implement the operations such as the impact on a very soft board and the alignment of the drill bit with a relatively small size.

Optionally, the electric motor 10 may be a sensored motor, and the commutation detection device 30 may be a Hall sensor. The Hall sensor is used for detecting the commutation start point of each commutation of the electric motor 10, the commutation end point of each commutation of the electric motor 10, and the duration required for each commutation.

In the process in which the electric motor 10 is started at a constant and low speed, the rotor of the electric motor 10 is likely to be locked. Therefore, a relatively high locked-rotor current may cause damage to power elements in a control circuit. To avoid this case, in the process in which the electric motor 10 rotates at the target rotational speed, the controller 40 may continuously monitor the commutation duration. If the commutation duration exceeds a set threshold, the control signal is no longer changed, that is, a duty cycle of a PWM signal is no longer increased, and the electric motor 10 is controlled to enter a locked rotor protection program. That is to say, in the process in which the electric motor 10 is started at the constant and low speed, it may be determined whether the electric motor 10 is started successfully according to commutation time. If the commutation time does not exceed the set threshold, it may be considered that the electric motor 10 is started successfully, and otherwise, the electric motor 10 is not started successfully. If the electric motor 10 is not started successfully, the electric motor 10 directly enters the locked rotor protection program to prevent an excessively high current from burning the power elements in the tool.

Figure 3:
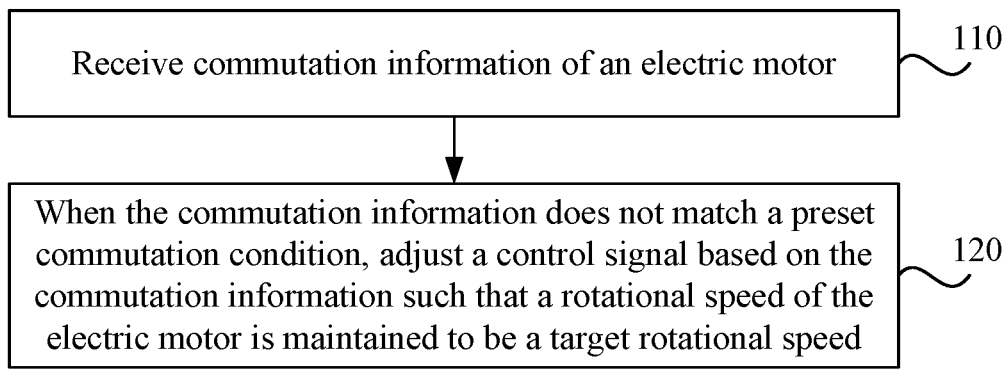
FIG. 3 is a flowchart of a control method for a power tool in an example of the present application.

FIG. 3 is a flowchart of a control method for a power tool 100 according to an example of the present application. This example is applicable to an implementation process of the control method for a power tool 100. The method may be performed by the power tool 100 provided in the example of the present application. The power tool 100 includes an electric motor 10, an output shaft, a commutation detection device 30, and a controller. The output shaft is electrically connected to the electric motor 10. The commutation detection device 30 is electrically connected to the electric motor 10 and used for detecting and obtaining commutation information about each commutation of the electric motor 10.

The controller 40 is electrically connected to at least the electric motor 10 and the commutation detection device 30.

Referring to FIG. 3, the control method for a power tool 100 includes the steps described below.

In step 110, the commutation information of the electric motor 10 is received.

Specifically, the power tool 100 includes the electric motor 10, the output shaft, the commutation detection device 30, the controller, and the like. The commutation detection device 30 is electrically connected to the electric motor 10 and the controller 40 separately. The commutation detection device 30 such as a Hall sensor may detect and obtain the commutation information about each commutation of the electric motor 10 and send the commutation information to the controller.

In step 120, when the commutation information does not match a preset commutation condition, a control signal is adjusted based on the commutation information such that a rotational speed of the electric motor 10 is maintained to be a target rotational speed.

Specifically, the controller 40 receives the commutation information of the electric motor 10 and compares the commutation information of the electric motor 10 with the preset commutation condition. When the commutation information does not match the preset commutation condition, the control signal is adjusted based on the commutation information such that the rotational speed of the electric motor 10 is maintained to be the target rotational speed. Thus, the output shaft can output the target rotational speed constantly so that a user can implement operations such as impact on a very soft board and alignment of a drill bit with a relatively small size.

According to the technical solution in this example, the control method for a power tool 100 is provided. The control method for a power tool 100 is performed by the power tool 100, and the power tool 100 includes the electric motor 10, the output shaft, the commutation detection device 30, and the controller, where the output shaft is electrically connected to the electric motor 10, the commutation detection device 30 is electrically connected to the electric motor 10 and used for detecting and obtaining the commutation information about each commutation of the electric motor 10, and the controller 40 is electrically connected to at least the electric motor 10 and the commutation detection device 30. The control method for a power tool 100 includes: receiving the commutation information of the electric motor 10; and when the commutation information does not match the preset commutation condition, adjusting the control signal based on the commutation information such that the rotational speed of the electric motor 10 is maintained to be the target rotational speed. The control method for a power tool 100 can solve the problem that it is difficult for an existing power tool 100 working at a low speed to complete a target working task due to the low speed and low torque. In a working process, the power tool 100 receives the commutation information of the electric motor 10 and can adjust the control signal based on the commutation information when the commutation information does not match the preset commutation condition such that the rotational speed of the electric motor 10 is maintained to be the target rotational speed. Thus, the case can be avoided where the power tool 100 cannot complete the working task in the process since the electric motor 10 outputs a relatively low speed or has an unstable rotational speed, and the power tool 100 can be controlled to work at a constant and low speed.

Optionally, the commutation information about each commutation of the electric motor 10 includes at least a commutation start point of each commutation, a commutation end point of the commutation, and duration required for each commutation.

It is to be noted that the above are only preferred examples of the present application and the technical principles used therein. It is to be understood by those skilled in the art that the present application is not limited to the examples described herein. For those skilled in the art, various apparent modifications, adaptations, and substitutions can be made without departing from the scope of the present application. Therefore, while the present application is described in detail in conjunction with the preceding examples, the present application is not limited to the preceding examples and may include equivalent examples without departing from the concept of the present application. The scope of the present application is determined by the scope of the appended claims.

What is claimed is:

1. A power tool, comprising:
   an electric motor;
   an output shaft connected to the electric motor;
   a commutation detection device electrically connected to the electric motor and used for detecting and obtaining commutation information about each commutation of the electric motor; and
   a controller electrically connected to at least the electric motor and the commutation detection device and capable of outputting a control signal to control the electric motor to rotate;
   wherein the controller is configured to:
   receive the commutation information of the electric motor; and
   when the commutation information does not match a preset commutation condition, adjust the control signal based on the commutation information such that a rotational speed of the electric motor is maintained to be a target rotational speed,
   wherein the controller is configured to:
   update a commutation information about the current commutation according to a commutation information about a last commutation when the current commutation of the electric motor is not completed; and
   adjust the control signal according to the updated commutation information about the current commutation such that the rotational speed of the electric motor is maintained to be the target rotational speed.

2. The power tool according to claim 1, wherein the controller is configured to:
   calculate the rotational speed of the electric motor according to the updated commutation information about the current commutation; and
   adjust the control signal when the rotational speed of the electric motor does not satisfy the target rotational speed such that the rotational speed of the electric motor is maintained to be the target rotational speed.

3. The power tool according to claim 2, wherein the commutation information about each commutation of the electric motor comprises at least a commutation start point of each commutation, a commutation end point of each commutation, and a commutation duration required for each commutation.

4. The power tool according to claim 3, wherein the controller is configured to:
   update a commutation duration of the current commutation using a commutation end point of the last commutation as a commutation start point of the current commutation; and calculate the rotational speed of the electric motor according to the updated commutation duration of the current commutation.

5. The power tool according to claim 3, wherein that the current commutation of the electric motor is not completed comprises that the commutation duration of the current commutation of the electric motor is longer than a commutation duration of the last commutation or that no commutation is performed within the commutation duration of the current commutation.

6. The power tool according to claim 1, wherein the target rotational speed is greater than or equal to 100 RPM and less than or equal to 300 RPM.

7. The power tool according to claim 1, wherein the target rotational speed is a fixed value.

8. The power tool according to claim 1, wherein the target rotational speed is greater than or equal to 100 RPM and less than or equal to 200 RPM.

9. The power tool according to claim 1, wherein the target rotational speed is greater than or equal to 100 RPM and less than or equal to 150 RPM.

10. The power tool according to claim 1, wherein the electric motor is a sensorless motor.

11. The power tool according to claim 1, wherein the controller is configured to:
when a commutation duration of the electric motor is longer than or equal to a set threshold, control the electric motor to perform locked rotor protection in a process in which the electric motor rotates at the target rotational speed.

12. An impact wrench, comprising:
an electric motor;
an output shaft connected to the electric motor;
a commutation detection device electrically connected to the electric motor and used for detecting and obtaining a commutation information about each commutation of the electric motor; and
a controller electrically connected to at least the electric motor and the commutation detection device and capable of outputting a control signal to control the electric motor to rotate;
wherein the controller is configured to:
receive the commutation information of the electric motor; and
when the commutation information does not match a preset commutation condition, adjust the control signal based on the commutation information such that a rotational speed of the electric motor reaches to a target rotational speed,
wherein the controller is configured to:
when a commutation duration of the electric motor is longer than or equal to a set threshold, control the electric motor to perform locked rotor protection in a process in which the electric motor rotates at the target rotational speed.

13. The impact wrench according to claim 12, wherein the target rotational speed is greater than or equal to 100 RPM and less than or equal to 300 RPM.

14. The impact wrench according to claim 12, wherein the target rotational speed is greater than or equal to 100 RPM and less than or equal to 200 RPM.

15. The impact wrench according to claim 12, wherein the target rotational speed is greater than or equal to 100 RPM and less than or equal to 150 RPM.

16. A control method for a power tool, wherein the power tool comprises an electric motor, a commutation detection device electrically connected to the electric motor and used for detecting and obtaining a commutation information about each commutation of the electric motor, and a controller electrically connected to at least the electric motor and the commutation detection device and capable of outputting a control signal to control the electric motor to rotate; and
wherein the control method comprises:
receiving the commutation information of the electric motor; and
when the commutation information does not match a preset commutation condition, adjusting the control signal based on the commutation information such that a rotational speed of the electric motor changes toward a target rotational speed,
wherein the commutation information about each commutation of the electric motor comprises at least a commutation start point of each commutation, a commutation end point of the commutation, and a duration required for the commutation,
further comprising:
updating a commutation duration of a current commutation using a commutation end point of a last commutation as a commutation start point of the current commutation; and
calculating the rotational speed of the electric motor according to the updated commutation duration of the current commutation.

17. The control method for a power tool according to claim 16, further comprising:
updating a commutation information about the current commutation according to a commutation information about a last commutation when the current commutation of the electric motor is not completed; and
adjusting the control signal according to the updated commutation information about the current commutation such that the rotational speed of the electric motor changes toward the target rotational speed.

* * * * *